(12) United States Patent
Reda et al.

(10) Patent No.: US 10,175,705 B2
(45) Date of Patent: Jan. 8, 2019

(54) POWER MAPPING AND MODELING SYSTEM FOR INTEGRATED CIRCUITS

(71) Applicant: Brown University, Providence, RI (US)

(72) Inventors: Sherief Reda, Providence, RI (US); Abdullah Nowroz, Providence, RI (US); Kapil Dev, Providence, RI (US)

(73) Assignee: Brown University, Providence, RI (US)

( * ) Notice: Subject to any disclaimer, the term of this patent is extended or adjusted under 35 U.S.C. 154(b) by 377 days.

(21) Appl. No.: 14/183,384

(22) Filed: Feb. 18, 2014

(65) Prior Publication Data

US 2016/0124443 A1 May 5, 2016

Related U.S. Application Data

(60) Provisional application No. 61/766,070, filed on Feb. 18, 2013.

(51) Int. Cl.
*G05D 7/00* (2006.01)
*G05D 11/00* (2006.01)
(Continued)

(52) U.S. Cl.
CPC ......... *G05D 23/1917* (2013.01); *G06F 1/203* (2013.01)

(58) Field of Classification Search
None
See application file for complete search history.

(56) References Cited

U.S. PATENT DOCUMENTS 8,978,401 B2 * 3/2015 Chainer ............. H05K 7/20836
62/201

2012/0123595 A1 * 5/2012 Bower, III ......... G05D 23/1934
700/282

OTHER PUBLICATIONS

Mesa-Martinez et al, Characterizing Processor Thermal Behavior, ACM 2010, 12 pages.*

(Continued)

*Primary Examiner* — Diem Cao
(74) *Attorney, Agent, or Firm* — Alder Pollock & Sheehan P.C.; Daniel J. Holmander, Esq.

(57) ABSTRACT

This invention relates to a power mapping and modeling system for integrated circuits. An automated process includes determining a floor plan of the integrated circuit, dividing the integrated circuit into blocks based on the floor plan, pumping oil through an inlet valve, over the integrated circuit, and out an outlet valve to create a simulated oil-based cooling system, injecting a plurality of power pulses across the integrated circuit, applying infrared image techniques to the integrated circuit to create measured thermal images for the simulated oil-based cooling system, setting up a finite-element model (FEM) to estimate entries in a first thermal-to-power modeling matrix for the simulated oil-based cooling system, determining and storing performance monitoring counter (PMC) measurements related to power consumptions of the blocks of the integrated circuit, reconstructing a power dissipation for the simulated oil-based cooling system by using a thermal map for the simulated oil-based cooling system system, using the power dissipation of the simulated oil-based cooling system, the FEM, and the PMC measurements to create a thermal map for a copper based cooling system, and creating a final thermal-to-power model for the integrated circuit from the thermal map for the model copper based cooling system.

5 Claims, 20 Drawing Sheets

(51) Int. Cl.
G05D 23/19 (2006.01)
G06F 1/20 (2006.01)

(56) References Cited

OTHER PUBLICATIONS

Mesa-Martinez et al, Power Model Validation Through Thermal Measurements, ACM 2007, 10 page.*
Knox et al, The Development of a Flexible and Efficient Chip Thermal Imaging Capability, IBM, Jun. 2011, 25 pages.*
Huang et al., Differentiating the Roles of IR Measurement and Simulation for Power and Temperature-Aware Design, University of Virginia, 2009, 10 pages.*
Canturk Isci et. al., Runtime Power Monitoring in High-End Processors: Methodology and Empirical Data, Proceedings. 36th Annual IEEE/ACM International Symposium on Microarchitecture, 2003. MICRO-36, 2003, 93-104, United States.
David Brooks et. al., Wattch: A Framework for Architectural-Level Power Analysis and Optimizations, ISCA 2000, 2000, 83-94, ACM 2000, United States.
Ehsan K. Ardestani et. al., Cooling Solutions for Processor Infrared Thermography, 26th IEEE Semi-Therm Symposium, 2010, 187-190, Department of Computer Engineering, University of California Santa Cruz, United States.
F. J. Mesa-Martinez et al., "Measuring Performance, Power, and Temperature from Real Processors," in International Symposium on Computer Architecture, 2007, pp. 1-10.
Francisco J. Mesa-Martinez et. al., Characterizing Processor Thermal Behavior, 2010, Department of Computer Engineering at University of California Santa Cruz, United States.
H. Hamann et al., "Hotspot-Limited Microprocessors: Direct Temperature and Power Distribution Measurements," IEEE Journal of Solid-State Circuits, vol. 42, No. 1, pp. 56-65, 2007.
Haihua Su et. al., Full Chip Leakage Estimation Considering Power Supply and Temperature Variations, ISLPED 03', 2003, 78-83, IBM Corporation, United States.
Jorgen Peddersen et. al., CLIPPER: Counter-based Low Impact Processor Power Estimation at Run-time, Asia and South Pacific Design Automation Conference, 890-895, 9A-5, School of Computer Science and Engineering, The University of New South Wales, National ICT Australia, The University of New South Wales, Sydney, Australia.
Karan Singh et. al., Real Time Power Estimation and Thread Scheduling via Performance Counters, SIGARCH Computer Architecture News, 46-55, vol. 37, ACM New York, United States.
Michael D. Powell et. al., Camp: A Technique to Estimate Per-Structure Power at Run-time using a Few Simple Parameters, 2008, 289-300, Department of Electrical and Computer Engineering, Virginia Tech, United States.
Min Yeol Lim et. al., SoftPower: Fine-Grain Power Estimations Using Performance Counters, HDPC '10, 2010, 308-311, United States.
Minki Cho et. al., Thermal System Identification (TSI): A Methodology for Post-silicon Characterization and Prediction of the Transient Thermal Field in Multicore Chips, 28th IEEE Semi-Therm Symposium, 2012, 1-8, United States.
Ramon Bertran et. al., Decomposable and Responsive Power Models for Multicore Processors using Performance Counters, ICS '10 Proceedings of the 24th ACM International Conference on Supercomputing, 2010, 147-158, United States.
Russ Joseph et. al., Run-time Power Estimation in High-Performance Microprocessors, Proceedings of the International Symposium on Low Power Electronics and Design, Digest of Technical Papers, 2001, 135-140, United States.
Ryan Cochran et. al., Post-Silicon Power Characterization Using Thermal Infrared Emissions, 2010, 331-336, School of Engineering, Brown University, United States.
Travis Kemper et. al., Ultrafast Temperature Profile Calculation in IC Chips, Therminic 2006, 2006, 1-5, TIMA Editions, United States.
Victor Jimenez et. al., Power and Thermal Characterization of POWER6 System, International Conference, 2010, 1-13, United States.
W.L. Bircher et. al., Runtime Identification of Microprocessor Energy Saving Opportunities, ISLPED '05, Proceedings of the 2005 International Symposium on Low Power Electronics and Design, 2005, 275-280, Laboratory for Computer Architecture, Department of Electrical and Computer Engineering, The University of Texas at Austin, United States.
Wei Huang et. al., Differentiating the Roles of IR Measurement and Simulation for Power and Temperature-Aware Design, 2009, 1-10, Departments of Computer Science, Electrical and Computer Engineering, Mechanical and Aerospace Engineering, University of Virginia, Charlottesville, Virginia, United States.
Wei Wu et al., A Systematic Method for Functional Unit Power Estimation in Microprocessors, 2006, 554-557, United States.
Weiping Liao et. al., Temperature and Supply Voltage Aware Performance and Power Modeling at Microarchitecture Level, IEEE Transactions, 2005, 1042-1053, vol. 24, United States.
Yongpan Liu et. al., Accurate Temperature-Dependent Integrated Circuit Leakage Power Estimation is Easy, Design, Automation and Test in Europe, 2007, United States.
Younes Shabany, Heat Transfer: Thermal Management of Electronics, 2009, CRC Press, United States.
Zhenyu Qi et. al., Temperature-to-Power Mapping, 28th International Conference on Computer Design, 2010, 384-389, United States.

* cited by examiner

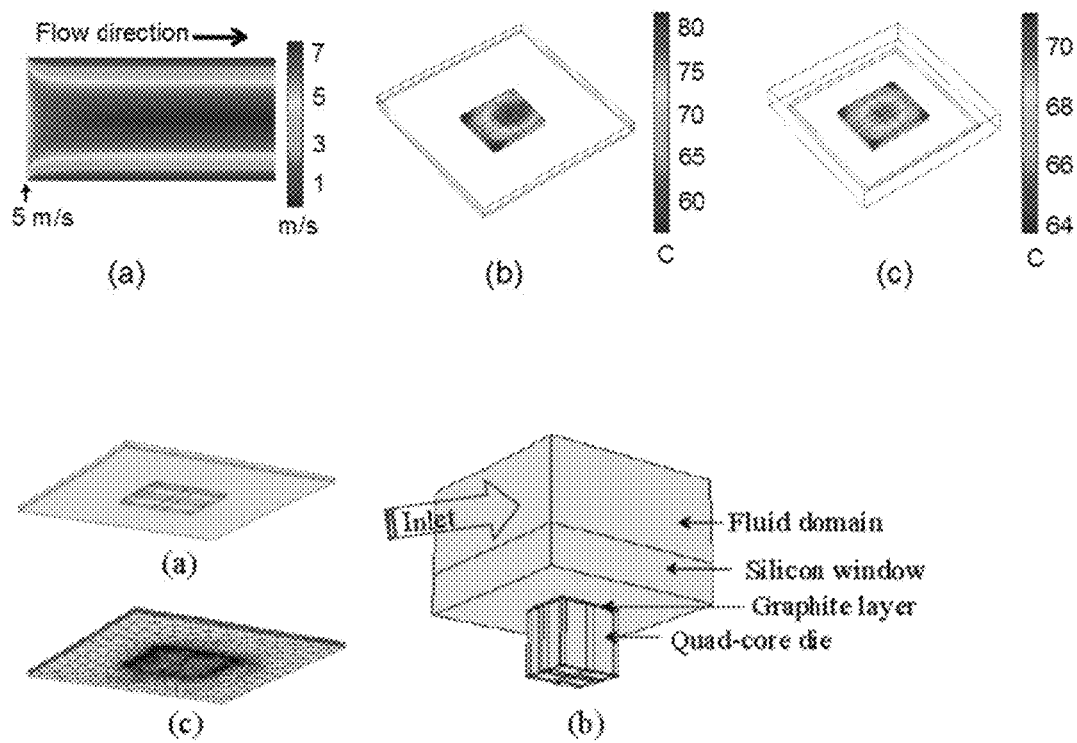
Figure 3: Model for oil-based system: (a) model-geometry with actual aspect-ratio; (b) model-geometry in perspective view; (c) meshed model

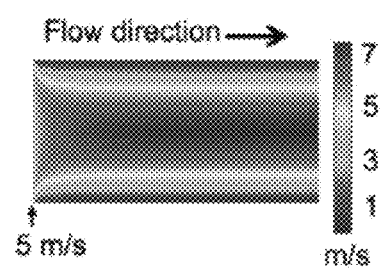
Figure 4: Velocity flow profile in the channel of the heat sink.

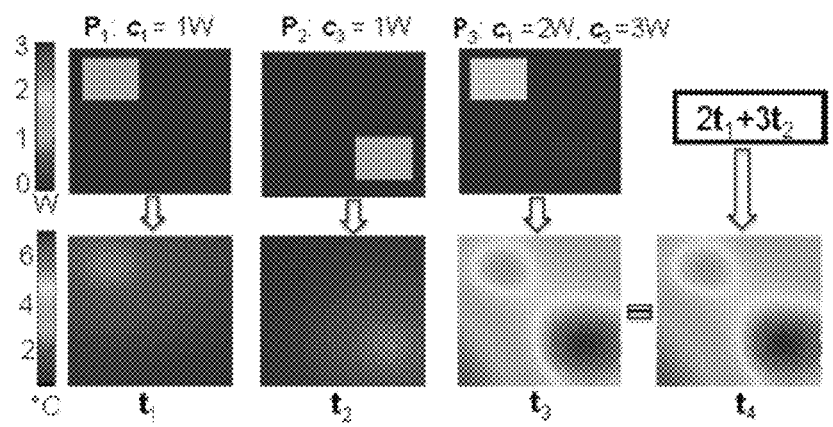
Figure 5: Verifying the linear relation between power and temperature for oil-based system. Temperatures are shown as $\Delta T$, difference over fluid-temperature.

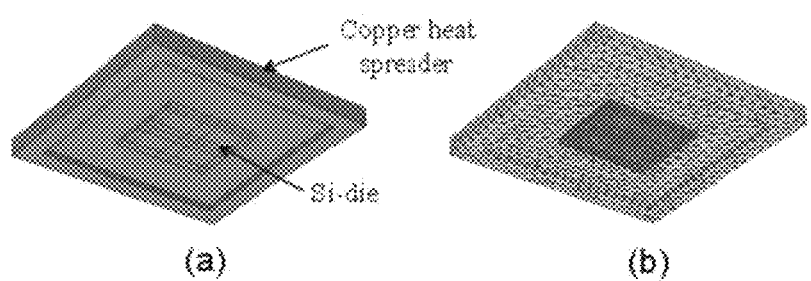
Figure 6: Simulated model for cu-based cooling system (a) Geometry; (b) Meshed model.

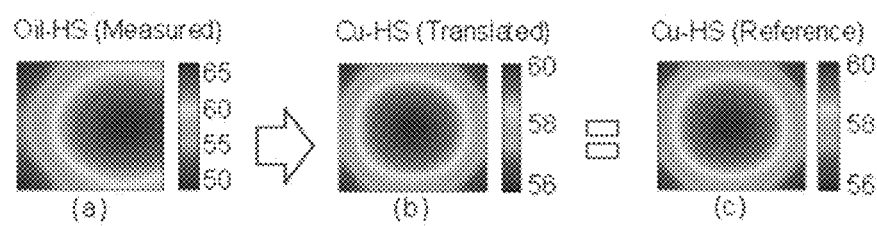
Figure 7: (a) Thermal map measured for oil heat sink system (b) thermal map for Cu heat spreader translated using Equation (4), and (c) thermal map simulated directly for Cu heat spreader.

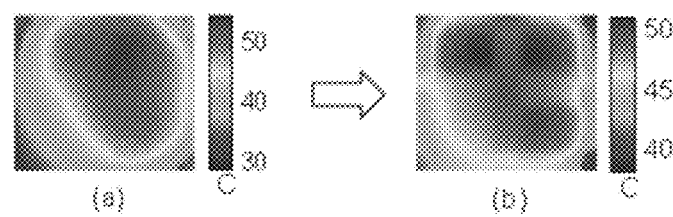
Figure 8: (a) Measured thermal map from oil-based cooling system (measured); (b) thermal map of cu-based cooling system translated using Equation (4).

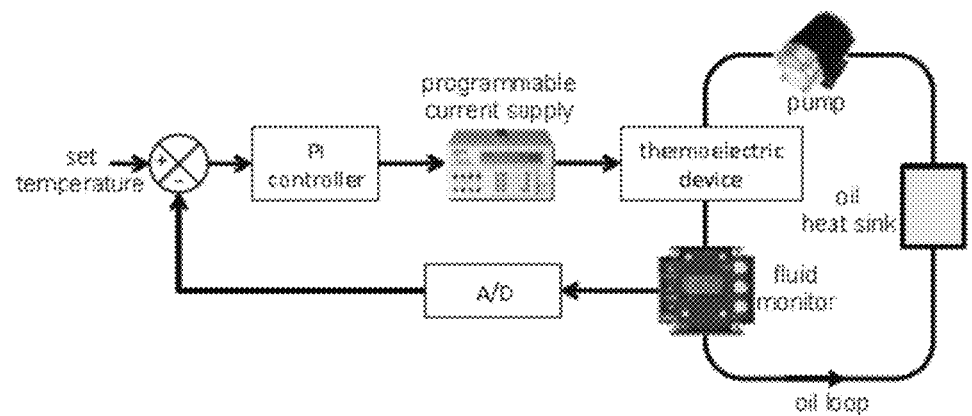
Figure 9: Experimental setup for thermal condititioning.

Procedure: PMC-based power modeling procedure
Input: Infrared-based power estimates for each block and associated PMC measurements
Output: Power Models for each block as a function of PMC measurements 1. For each circuit block $i$:
    a. Identify the PMC measurements that are strongly correlated with power estimates of $i$.
    b. Use least-square estimation to fit a linear model that estimates the power of $i$ as a function of the strongly-correlated PMC measurements.

Figure 10: Algorithm to compute PMC-based models.

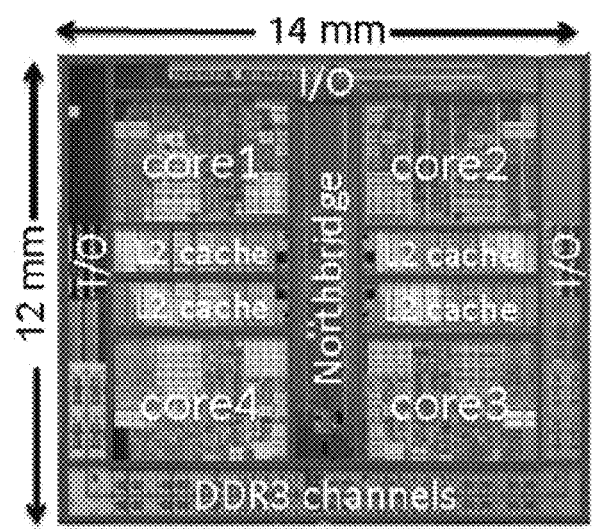
Figure 11: Layout processor

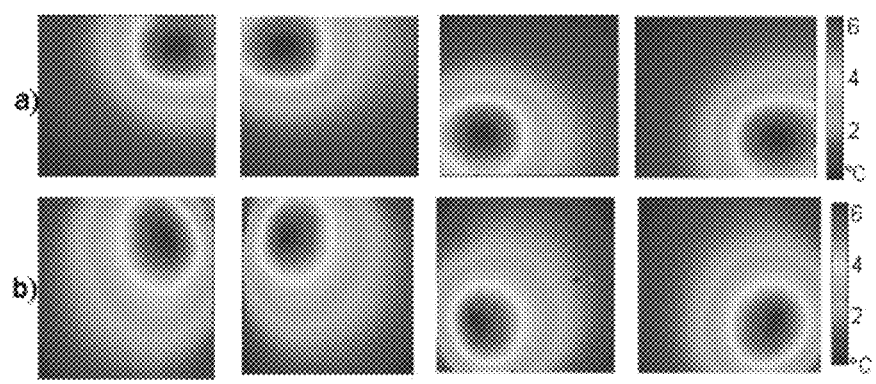
Figure 12: Thermal-matrix verification through comparison of impulse-responses of the system (a) simulated; (b) measured.

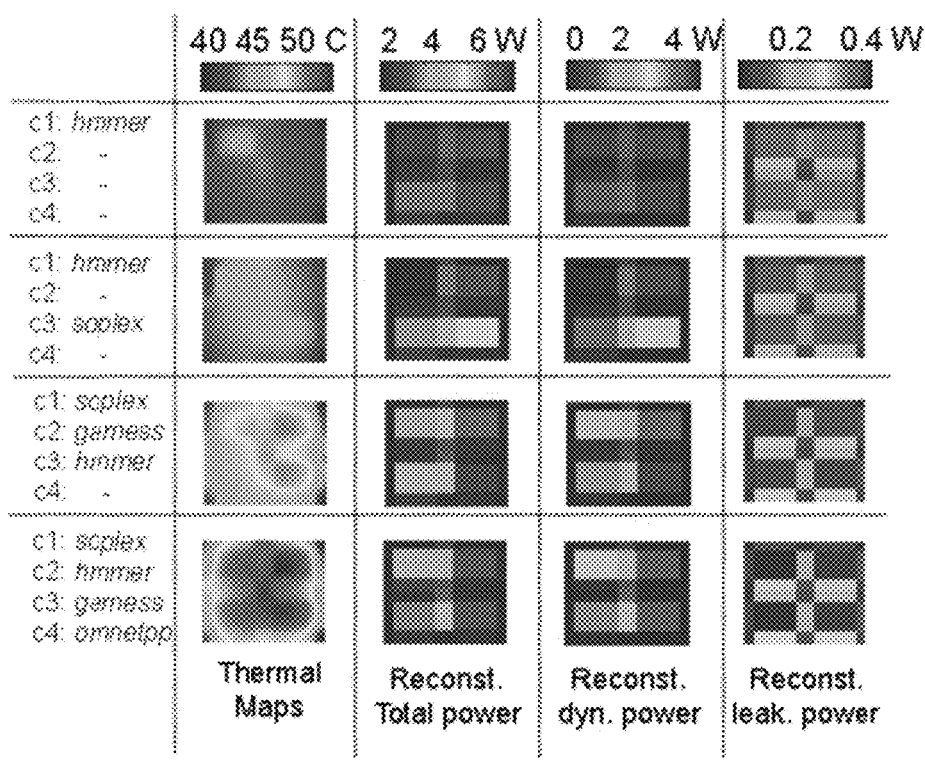
Figure 13: Thermal maps, reconstructed total-power, dynamic-power and leakage-power maps.

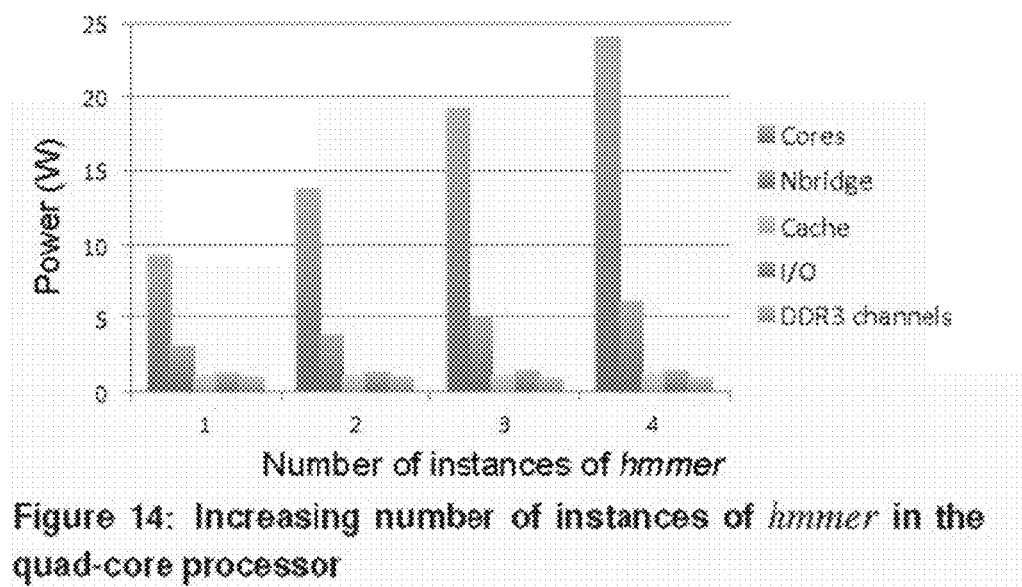
Figure 14: Increasing number of instances of *hmmer* in the quad-core processor

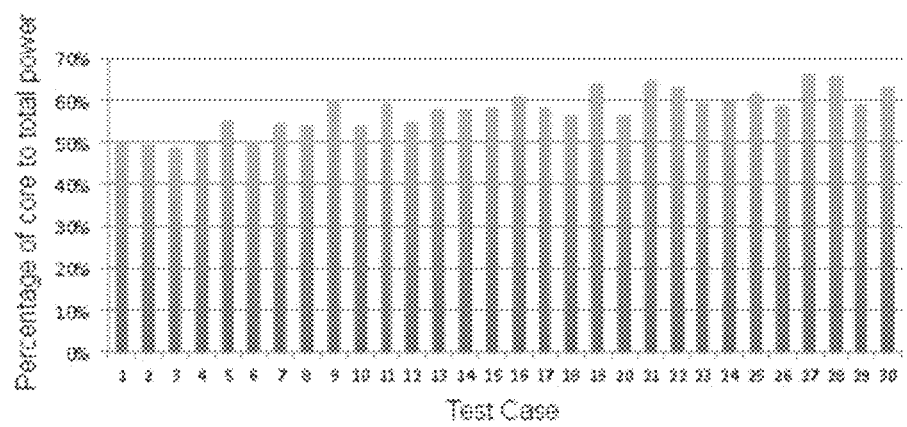
Figure 15: Percentage of core power to total power

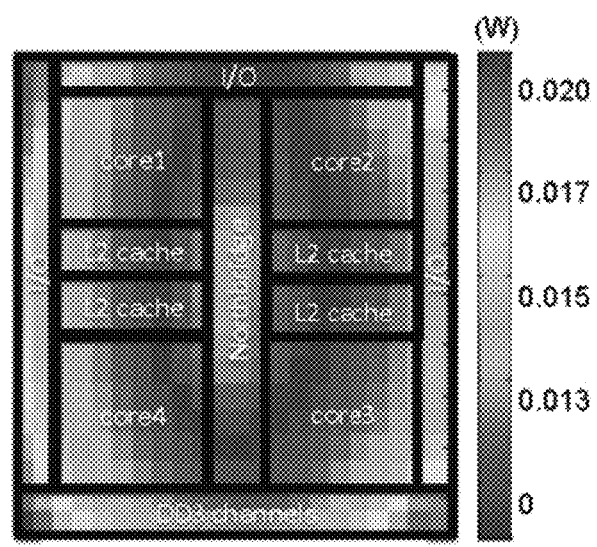
Figure 16: Leakage variability map of the processor.

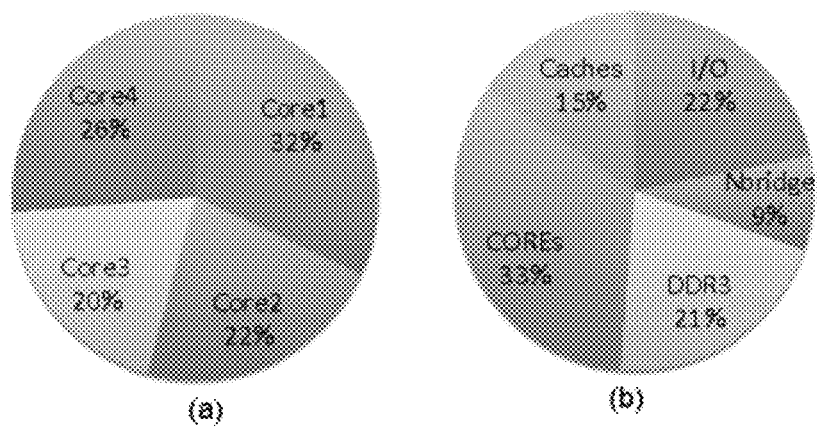
Figure 17: a) Percentage Leakage power per core with its L2 cache b) Percentage Leakage power per block type.

| #1 | REQUESTS_TO_L2 |
| #2 | DISPATCHED_FPU |
| #3 | RETIRED_UOPS |
| #4 | DCACHE_CACHE_ACESSES |
| #5 | L2_CACHE_MISS |
| #6 | MEMORY_REQUESTS |
| #7 | MEMORY_CONTROLLER_REQUESTS |
| #8 | CPU_TO_DRAM_REQUESTS |
| #9 | DRAM_ACCESSES_PAGE |
| #10 | DISPATCH_STALLS |
| #11 | RETIRED_BRANCH_INSTRUCTIONS |

| block power | correlates | anti correlates |
|---|---|---|
| cores | (3, 4, 11, 2) | -- |
| L2 caches | (10, 1, 11, 2, 7) | -- |
| Northbridge + misc | (3, 4, 11, 1, 9, 8, 7, 10, 2) | -- |
| I/O + DDR channels | 5 | (2, 11, 4, 3) |

Figure 18: Correlation between performance counters and power consumption of processor blocks.

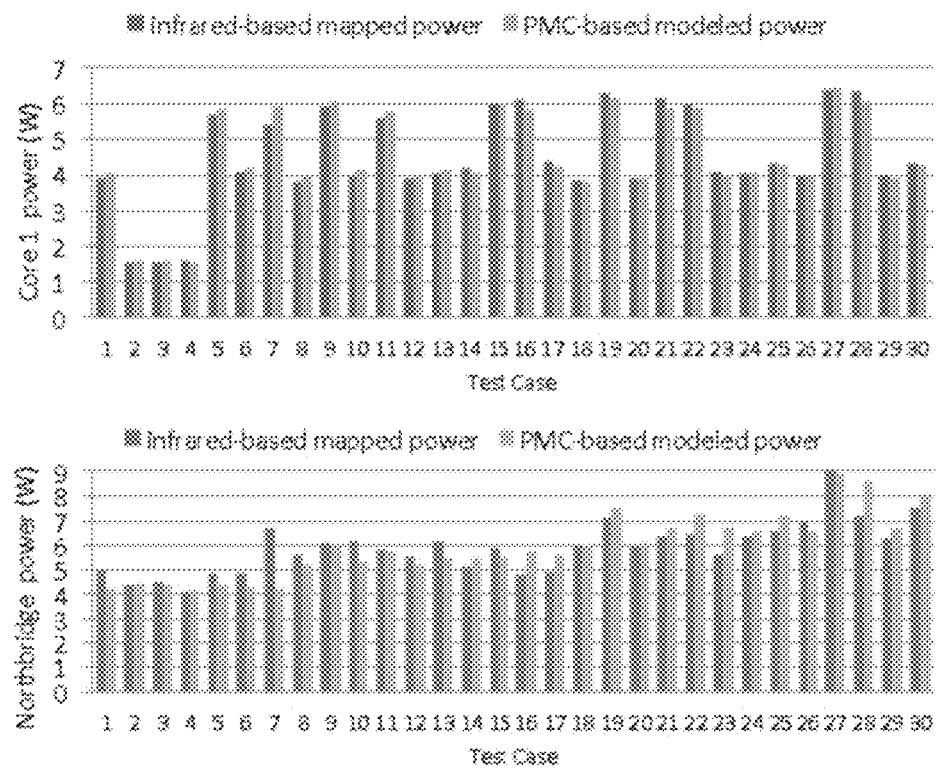
Figure 19: Power consumption as estimated by the infrared-based system and the fitted models using the performance counters for the 30 test cases.

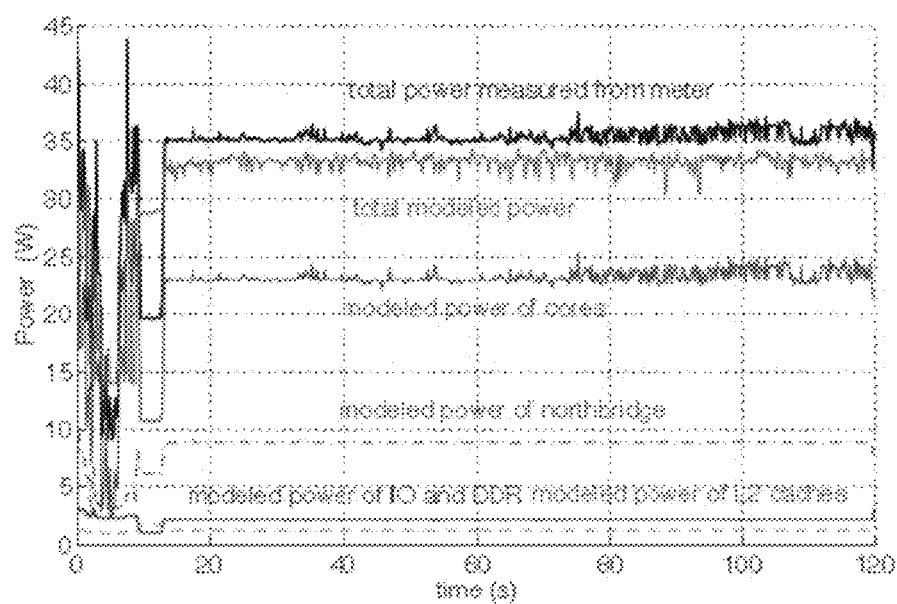
Figure 20: Transient power modeling using PMC measurements.

POWER MAPPING AND MODELING SYSTEM FOR INTEGRATED CIRCUITS

CROSS REFERENCE TO RELATED APPLICATION

This non-provisional patent application is related to and claims priority from earlier filed U.S. Provisional Patent Appl. No. 61/766,070 filed Feb. 18, 2013, incorporated by reference herein.

STATEMENT REGARDING FEDERALLY SPONSORED RESEARCH

This invention was made with government support under NSF grant 1115424. The government has certain rights in the invention.

BACKGROUND OF THE INVENTION

This invention relates in general to a system, apparatus, and method comprises one or more mapping and modeling systems used for power estimation, management, and improved efficiencies for the integrated circuit. In addition, the invention provides a feedback telemetry and actuation system, apparatus, and method for controlling the flow speed and temperature of coolant fluid over an integrated circuit.

Power is a major design challenge for chip architects due to its limiting nature on the performance on semiconductor-based chips. Modern multi-core processors designs are highly complex, incorporating a number of independent cores with billions of transistors. This complexity makes accurate pre-silicon power modeling a very difficult task. Furthermore, workloads and process variability alter the power consumption during runtime, making it harder to accurately estimate power consumption during design time.

In recent years, post-silicon power mapping has emerged as a technique to mitigate the uncertainties in design-time power models and enable effective post-silicon power characterization. Many of these techniques rely on inverting the thermal emissions captured from an operational chip into a power profile. However, this approach faces numerous challenges, such as, the need for accurate thermal to power modeling, the need to remove artifacts introduced by the experimental setup, where infrared transparent oil-based heat removal system can lead to incorrect thermal profiles, and leakage variabilities.

Post-silicon power mapping for multi-core processors is the process of reconstructing power dissipation in different hardware blocks from the thermal infrared emissions of the processor during operation and under realistic loading conditions. When a processor runs a workload, it consumes power, which dissipates heat and changes the temperature of the chip. The thermal emissions from the chip can be captured by an infrared imaging system, and processed to reveal the underlying power consumption profile.

Post-silicon power mapping involves many challenges at both the experimental and modeling fronts. At the experimental front, it is required to control the speed and temperature of the oil flow on top of the processor to remove the generated heat, while maintaining good optical transparency to the infrared imaging systems. Furthermore, it is important to accurately synchronize all the measurements of the system, including thermal maps, fluid state measurements, total power consumption, and PMC measurements from within the processor.

At the processing front, challenges include the need to model the relationship between power consumption and temperature. This process is complicated by the fact that replacing the fan and copper heat-spreader with an infrared-transparent fluid-based heat sink system alters the thermal profile of the die. Compromised thermal characteristics will alter the leakage profile of the processor. Decomposing the total power into leakage and dynamic is a challenging task due to the dependency of leakage on process variability and temperature.

A popular approach for modeling total power is through the use of performance monitoring counters (PMCs). Performance counters are embedded in the processor to track the usage of different processor blocks. Examples of such events include the number of retired instructions, the number of cache hits, and the number of correctly predicted branches. The general approach of existing techniques is to choose a set of plausible performance counters to model the activity of each structure in the processor and then create empirical models that utilize the activities to estimate the power of each structure and the total power. In almost all existing techniques, the main way to verify the correctness is through the observation of the total power.

Power related issues in modern multi-core processors have made post-silicon power analysis a necessity in IC design flow. One of the most important factors in estimating post-silicon power is to have an accurate modeling matrix R which relates temperature to power. A modeling matrix was constructed using a laser measurements setup that injects individual powers pulses on the actual chip and measures the resultant response. In another system, a controlled test chip was to experimentally find the R-matrix by enabling each block in the test circuits. Both these methods need extensive experimental setup or special circuit design needs.

It would therefore be desirable to provide a more efficient and optimized feedback telemetry and actuation system for an integrated circuit comprising one or more mapping and modeling systems used for power estimation, management, and improved efficiencies in operation of the integrated circuit.

BRIEF SUMMARY OF THE INVENTION

This invention relates in general to a system, apparatus, and method comprises one or more mapping and modeling systems used for power estimation, management, and improved efficiencies for the integrated circuit. In addition, the invention provides a feedback telemetry and actuation system, apparatus, and method for controlling the flow speed and temperature of coolant fluid over an integrated circuit.

In one embodiment, a thermal-to-power modeling system is configured to receive the coolant fluid flow speed and temperature of the coolant fluid from the one or more sensor devices. The thermal-to-power modeling system is configured to receive a floor plan of the integrated circuit. The thermal-to-power modeling system is configured to setup a finite-element model which simulates the heat conduction in the integrated circuit and the heat convection at its surface due to coolant fluid motion. The finite-element model is configured to estimate the entries in a thermal-to-power modeling matrix in either DC mode or AC mode.

In one embodiment, one or more external measurement systems may be configured to measure the total power consumption on different rails of the integrated circuits. The one or external measurement systems comprises one or more internal thermal sensors to establish constraints, the constraints facilitate the thermal-to-power modeling system to produce power mapping results. In one embodiment, a thermal-to-power optimization system operationally combines the thermal-to-power modeling system and the one or more external measurement systems.

In one embodiment, a run-time power estimator system is configured to collect performance monitoring counter (PMC) measurements from one or more circuit blocks of the integrated circuits in synchronization while performing infrared-based power mapping. The run-time power estimator system uses the collected per-block PMC measurements to calculate mathematical PMC-based models for the actual power consumption of the one or more circuit blocks as identified by the infrared-based power mapping. The PMC-based models are configured to estimate power consumption when infrared imaging is unavailable. The PMC-based models are configured to analyze the transient power consumption of the one or more circuit blocks. The PMC-based models are configured to be used for power estimation and management.

In one embodiment, the system comprises one or more sensor devices, an A/D-D/A acquisition interface or box, a feedback controller, an adjustable motor pump, a thermoelectric cooler. The one or more sensor devices are configured to measure coolant fluid flow speed and coolant fluid temperature. An A/D-D/A acquisition interface or box is configured to collect the flow speed and temperature of the fluid. The A/D-D/A acquisition interface or box is configured to adjust the speed of the fluid flow and the temperature of the fluid to maintain a set temperature point. A motor pump is configured to adjust the speed of the fluid flow as instructed by the A/D-D/A acquisition interface or box. A thermoelectric cooler is configured to adjust the temperature of the fluid as instructed by the A/D-D/A acquisition interface or box. In one embodiment, a feedback controller is operationally connected to the A/D-D/A acquisition interface to collect the flow speed and temperature of the fluid and adjust the speed of the fluid flow and the temperature of the fluid to maintain a set temperature point. By way of example, and without limitation, the feedback controller is implemented on a computer, network, or internet.

In operation, based upon the measurements of the coolant fluid flow speed and the temperature and comparison to the set temperature point, the A/D-D/A acquisition interface adjusts the speed and temperature of the coolant fluid flow to maintain the set temperature point of the coolant fluid.

BRIEF DESCRIPTION OF THE DRAWINGS

The novel features which are characteristic of the present invention are set forth in the appended claims. However, the method and system of the present invention together with further embodiments and attendant advantages, will be best understood by reference to the following detailed description taken in connection with the accompanying drawings in which:

FIG. 3 is a schematic view of a model for oil-based system;

FIG. 4 is a schematic view of a velocity flow profile in the channel of the heat sink;

FIG. 5 is a schematic view illustrating the linear relation between power and temperature for oil-based system;

FIG. 6 is a perspective view of a simulated model for cu-based cooling system;

FIG. 7 is a schematic view of a thermal map measured for oil heat sink system;

FIG. 8 is a schematic view of a thermal map from oil-based cooling system;

FIG. 9 is a schematic view of the feedback telemetry and actuation system and method for controlling the flow speed and temperature of coolant fluid over an integrated circuit;

FIG. 10 is an algorithm for computing PMC-based models;

FIG. 11 is the layout of a prior art processor as merely an example of an integrated circuit;

FIG. 12 is a schematic view illustrating a thermal-matrix verification through comparison of impulse-responses of the system both simulated and measured.

FIG. 13 is schematic view illustrating thermal maps, reconstructed total-power, dynamic-power and leakage-power maps;

FIG. 14 is a graph illustrating increasing number of instances of hmmer in the quad-core processor;

FIG. 15 is a graph illustrating percentage of core power to total power;

FIG. 16 is a schematic view illustrating leakage variability map of the processor of FIG. 11;

FIG. 17 is a graph illustrating percentage leakage power per core and percentage leakage power per block type;

FIG. 18 is a schematic view illustrating correlation between performance counters and power consumption of processor blocks;

FIG. 19 is a graph illustrating power consumption as estimated by the infrared-based system and the fitted models using the performance counters for the 30 test cases; and FIG. 20 is a graph illustrating transient power modeling using PMC measurements.

DETAILED DESCRIPTION OF THE PREFERRED EMBODIMENTS

Figure 1:
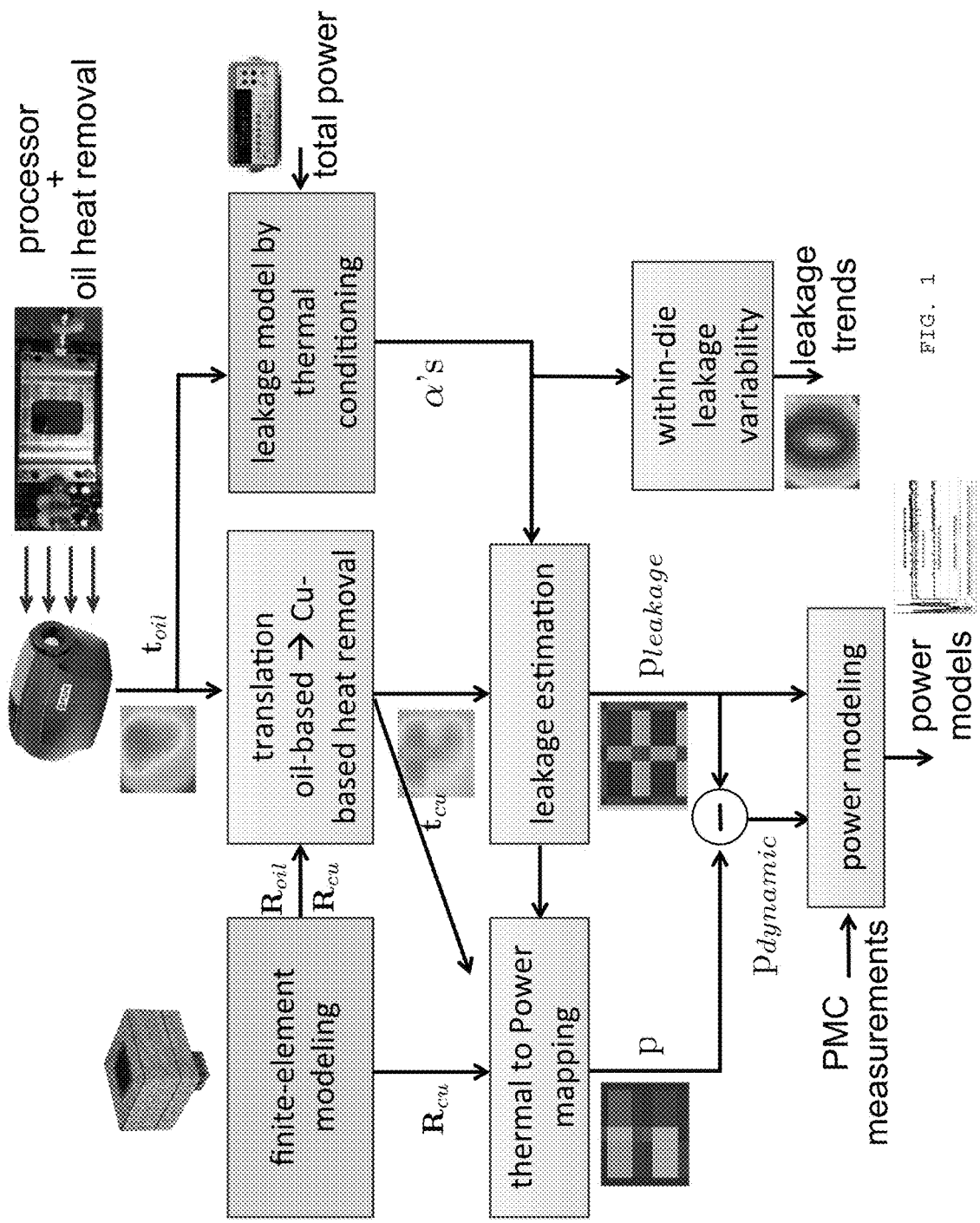
FIG. 1 is a flow diagram of a power mapping and modeling framework.

Referring generally to FIGS. 1-20, this invention relates in general to a system, apparatus, and method comprises one or more mapping and modeling systems used for power estimation, management, and improved efficiencies for the integrated circuit. In addition, the invention provides a feedback telemetry and actuation system, apparatus, and method for controlling the flow speed and temperature of coolant fluid over an integrated circuit.

1. Introduction

Accurate power characterization and modeling is extremely important in modern integrated circuits. In general, the invention comprises post-silicon power mapping and modeling of multi-core processors and/or integrated circuits using infrared imaging and performance counter measurements. A finite-element modeling framework is used to capture the relationship between temperature and power, while compensating for the artifacts introduced from substituting traditional heat removal mechanisms with oil-based infrared transparent cooling mechanisms. Furthermore, the per-block power consumption into leakage and dynamic using a novel thermal conditioning method. Using the leakage power models, a method to analyze within-die leakage spatial variations is provided. The actual power consumption of different blocks is provided for the performance monitoring counter (PMC) measurements using empirical models. In the experiments, thermal images from a quad-core processor is provided under different workload conditions, and then a reconstruct of the dynamic and leakage power maps is provided for different blocks. In addition, the impact of different workload characteristics and the number of workloads on the power profile are provided. Also, empirical power models for different blocks are developed based on the PMCs and per-block power consumption, and utilize the PMC-based models to analyze the transient power consumption.

The post-silicon power mapping and modeling framework is capable of identifying the dynamic and leakage power consumption of the main blocks of multi-core processors under different workloads, while simultaneously analyzing the impact of process variability on leakage and capturing the relationship between the PMCs and per-block power consumption.

Post-silicon power mapping requires the use of oil-based heat sinks to extract heat from the processor, while maintaining transparency to infrared emissions. As a result, the thermal and leakage power profiles could differ from the case of traditional metal+fan heat sinks. To address this problem, accurate finite-element models (FEMs) capture the physical relationship between temperature and power, while compensating for the thermal artifacts introduced by oil-base heat removal sinks.

A thermal conditioning technique to accurately model leakage variability across the die as a function of the thermal profile. The leakage models enable us to decompose the per-block power consumption into its dynamic and leakage components. The leakage model assesses the within-die leakage spatial variability trends.

Numerical optimization formulation for post-silicon power mapping inverts the thermal maps to power estimates to get total detailed power maps for different blocks (e.g. cores, L2-caches, northbridge, and I/Os) of a real quad-core processor while executing multiple workloads with different characteristics from the SPEC CPU2006 benchmarks.

Also, performance monitoring counter (PMC) measurements are collected throughout while performing infrared-based power mapping. In contrast to previous works in PMC-based modeling, our per-block PMC models are directly fitted to the actual power consumption of each block as identified by the infrared power mapping framework. The PMC-based models are used to analyze the transient power consumption of each processor block.

This information helps in debugging and alleviating power consumption hot spots, which leads to reduced power consumption. The PMC-based models enabled operating systems, applications and users to directly estimate the power consumption of an integrated circuit during runtime. These estimations can guide runtime power management systems to conserve power.

2. Power Mapping and Modeling Framework

Referring to FIG. 1, a framework is provided to estimate post-silicon dynamic and leakage power maps for different blocks of multi-core processors and to create power models that relate the estimated power and runtime performance monitoring counters. FIG. 1 gives the framework of the proposed power mapping and modeling method. At the beginning, a one-time design effort per chip-design is conducted to devise accurate FEMs ($R_{oil}$ and $R_{cu}$) that relate power to temperature under two heat removal mechanisms (oil-based and copper-based).

During runtime, realistic workloads are applied to the processor and the steady-state or averaged thermal map $t_{oil}$ is captured with the infrared camera. Using the devised FEMs, the captured thermal map is then translated to produce a thermal map, $t_{cu}$, that mimics the case when the oil-based heat sink is replaced by a traditional copper (Cu) spreader +fan heat removal mechanisms. Unless otherwise stated, the thermal maps are used with Cu based heat removal system but not limited to these types of heat removal systems.

Thermal conditioning is one-time modeling process that models the leakage power profile as a function of the temperature profile and can be further used to estimate the spatial variability trends. For each measured thermal map $t_{cu}$, the leakage models are used to estimate the leakage power per block. The thermal map is then numerically processed to yield the per-block power maps, where we use leakage power as lower bound constraint. The total power for each block in the core is separated into dynamic and leakage power. The estimated power for different blocks of the processor is then modeled with runtime performance monitoring counters and sensor measurements. The PMCs models can be then used to model the transient power consumption or in cases where no infrared imaging system is available.

3. Modeling Relationship Between Temperature and Power

Referring generally to FIGS. 2-8, a model of the relationship between power and temperature on a processor. In particular, if t is a vector that denotes the steady state or averaged thermal map of the processor in response to some power map denoted by p, then there is a model of the relationship between p and t. The length of p is determined by the number of the blocks in the processor's layout and the length of t is determined by the number of pixels in the thermal image.

Our modeling approach, which is described in the next three subsections, comprises the following three steps:

1. First described is the modeling and simulation of heat transfer in the case of oil-based heat sink. The underlying physics can be described by a linear operator $R_{oil}$ that maps p to $t_{oil}$. This operator is determined empirically by simulation using accurate FEM modeling.

2. The modeling and simulation of heat transfer with Cu-based heat sink is described. Here, the underlying physics can also be described by a linear operator $R_{cu}$ that maps p to $t_{cu}$.

3. In Subsection 3.3, a captured thermal image toil is translated to make it appear as if it is coming from a Cu-based heat spreader.

3.1. Modeling Oil-Based Heat Sink

Figure 2:
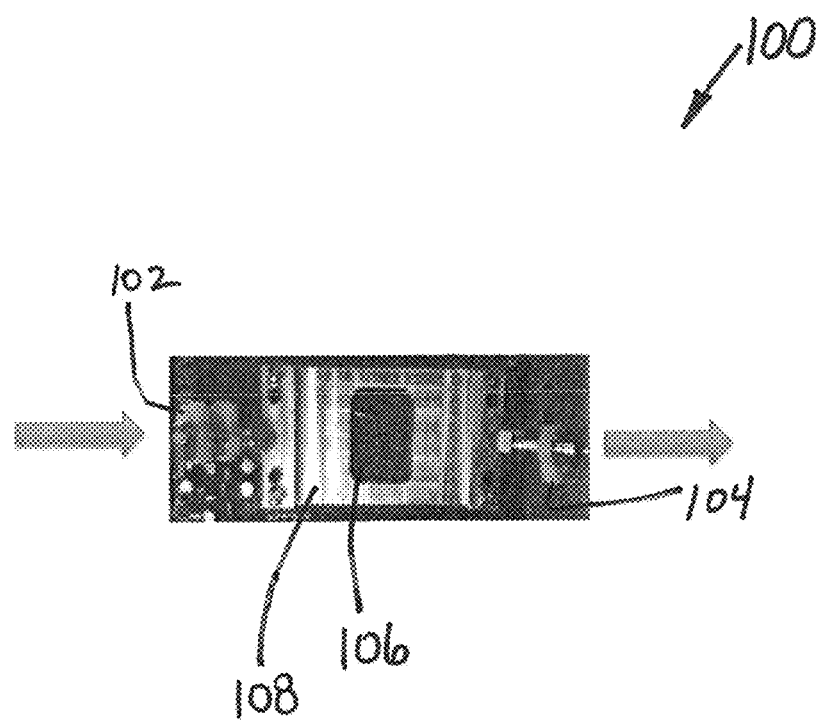
FIG. 2 is a schematic view of a infrared-transparent oil-based heat removal system.

Model Setup. To enable the thermal imaging of the processor while maintaining the cooling efficiency similar to conventional fan-based heat sink system, a special cooling system 100 was designed, as shown in FIG. 2. The system 100 has a rectangular channel of height 1 mm through which an infrared-transparent mineral oil is flowing from the inlet valve 102 to the outlet valve 104 as shown by the flow arrows. Two infrared-transparent windows 106 formed in a housing 108 (only the window 106 at the top can be seen and the other one at bottom of channel is blocked from view in FIG. 2) are assembled in the system 100 in such a way that the windows 106 allow midwave infrared waves to pass through part of the channel. In addition to being infrared transparent, the bottom window 106 spreads the heat generated in a small processor die over a larger area, which improves heat removal capacity.

When the multi-core processor is switched-on, heat is generated at the active (transistor) layer of the die. The majority of the heat generated inside processor-die flows upwards and is carried away by the fluid-flow after passing through the bottom window. Small portion of the heat also flows through a secondary path towards the bottom side of the die to the motherboard and eventually to ambient. Empirically, it was that in our setup about 10% of the heat flows downward through the secondary path and about 90% of the heat flows upward in our setup; so, we consider these values in our models. The infrared radiations from the silicon-die pass through the bottom window, fluid, and top window before they could be captured by the infrared camera. To improve the emissivity uniformity of the die, we apply a thin coating of graphite at the back side of the die; graphite has emissivity close to that of a perfect black body radiator.

We modeled the system in COMSOL Multiphysics tool, which is widely used to solve multiple coupled physical phenomena. COMSOL has a finite element analysis (FEM) based solver as its core computational-engine. The geometry of the simulated model is shown in FIG. 3a; FIG. 3b shows the zoomed picture, so it does not necessarily have same scale as actual scale. The model has following domains: the processor's die, divided into a number of blocks as dictated by the floorplan, a 25 um graphite-layer, a 2 um thermal interface material, an infrared-transparent silicon-window and fluid domain. We modeled the secondary path of heat removal by specifying a uniform heat removal rate from the bottom of the die. This uniform heat removal abstracts the impact of heat removal carried by the motherboard. The properties of different materials used in our simulation model are reported in Table 1 below.

TABLE 1

Material properties. $\rho$ denotes the density of the material in $kg/m^3$, k represents the thermal conductivity of the material in $W/(m \cdot K)$, $C_p$ denotes the specific heat capacity of the material at constant pressure in $J/(kg \cdot K)$, and $\mu$ represents the dynamic viscosity of the fluid in $Pa \cdot s$.

| material | $\rho$ | k | $C_p$ | $\mu$ |
|---|---|---|---|---|
| silicon | 2330 | 148 | 703 | — |
| graphite | 1950 | 150 | 710 | — |
| mineral oil | 838 | 0.138 | 1670 | 14.246e-3 |

Here, p denotes the density of the material in $kg/m^3$, k represents the thermal conductivity of the material in $W/(m \cdot K)$, $C_p$ denotes the specific heat capacity of the material at constant pressure in $J/(kg \cdot K)$, and u represents the dynamic viscosity of the fluid in $Pa \cdot s$. The dynamic viscosity is only defined for fluid and not for solid domains.

To solve the modeling problem using finite-element method (FEM), the complete geometry has to be divided into smaller elements in a process known as meshing Creating a proper mesh is important for two reasons: (1) a properly-sized mesh enables accurate simulation of the required physical phenomena, and (2) it controls the convergence of the numerical solution. For these two reasons, we refined the mesh to appropriate sizes at different interfaces and corners by adding boundary-layers and by choosing the mesh-size individually for each domain. The mesh is refined iteratively until it has significant impact on the final solution. The meshed model is shown in FIG. 3c.

Model Simulation. Essentially, we have to simulate two types of physics: fluid-flow and conjugate heat transfer, simultaneously to obtain the temperature profile for a given power dissipation profile of the processor. We describe these two simulations in the next paragraphs.

Fluid flow simulation: In our experimental system, we measured the flow speed, fluid temperature and the fluid pressure using a Proteus Fluid Vision flow meter. The average fluid speed is maintained at 5 m/s using a gear pump, the fluid temperature is maintained at 20 Celsius using a thermoelectric cooler with a feedback controller that receives its input from the fluid temperature meter, and the flood pressure at the inlet of heat sink is equal to 24 psi. In order to decide the nature of fluid-flow, we compute the ratio of inertial-force to viscous-force, also called Reynolds number (Re), for the measured flow-speed in our system. For our channel dimensions and fluid flow characteristics, we computed the Re number for the flow as 434.48. Since Re<1000, we consider a laminar flow in our model simulations. We assume that fluid-flow is incompressible, which is a reasonable assumption because the fluid is flowing at such a high speed that there does not exist significant temperature gradient in the fluid domain which could potentially change the fluid density.

Internally, the FEM tool solves Navier-Stokes conservation of momentum equation and conservation of mass equation to simulate the laminar flow. We use following boundary conditions during flow-simulation. Since the flow is laminar, we consider no-slip boundary condition at all four walls of the fluid-domain, i.e. the fluid has zero velocity at the boundary. We also consider a uniform normal inflow velocity at the inlet of fluid domain. The simulated velocity profile for the measured flow rate in the heat sink's channel is shown in FIG. 4.

Heat transfer simulation: We have to simulate the heat transfer in both solid and fluid domains. During all our experiments, we wait for the steady-state of the processor before we capture its thermal image. So, we simulate the heat-transfer equation in steady-state, where the heat equation in solid and fluid domains is given by:

$$\rho C_p v \cdot \nabla T = \nabla \cdot (k \nabla T) + Q \quad (1)$$

where, T is the temperature in Kelvin, v is the velocity field, and Q denotes the heat sources in $W/m^3$. For heat-transfer physics, we use following boundary conditions during simulation. It is assumed that all external walls of the system exchange heat with ambience through natural convection process; the typical heat-transfer coefficient (h) for natural heat convection is 5 $W/(m^2 \cdot K)$.

In the simulation model, we assume a standard silicon die of 750 um and that power dissipation happens at the bottom of silicon die. Hence, if a particular block i of the die is dissipating, say, Qi amount of power per unit area, then, in order to compute the temperature profile, we apply $p_i = Q_i *$ Block_Area Watts of power to that block and simulate the heat-transfer and fluid-flow equations simultaneously.

Model Matrix Operator. While the model setup and simulation under various power profiles is a time-consuming task, the entire system operation can be represented by a modeling matrix, denoted by $R_{oil}$, which is a linear operator that maps the power profile into a thermal map. If p is a vector that denotes the power map, where the power of each block, pi, is represented by an element in p, then $R_{oil} p = t_{oil}$. The values of the matrix $R_{oil}$ are learned through the FEM simulations of the setup, where we apply unit power pulses at each block location, one at a time, and compute the thermal profile at the die-surface for each case. The thermal profile resultant from activating block i corresponds to the i column of $R_{oil}$. After simulating all blocks, we have the model matrix ($R_{oil}$) complete. This thermal matrix can be used to relate any power profile and to the temperature profile.

To validate that the power to thermal relationship of the complete system can be modeled using a linear operator, we performed the following experiment. First, we simulated the temperature profile by allocating 1 W of power to the top-left part of a die; the simulated thermal map, $t_1$, is shown in the first column of FIG. 5. Next, we applied a unit power to the bottom-right part of the die and obtained the temperature map, $t_2$, shown in the second column of FIG. 5. Third, we simulated the temperature profile by assuming that the top left is dissipating 2 W and the bottom-right is dissipating 3 W power. The simulated temperature map, $t_3$ for this case is shown in the third column of FIG. 5. If the physics of system can be indeed represented by a linear operator, then the superposition principle should hold, and the temperature map simulated in the third case, $t_3$, should be equal to $2t_1+3t_2$). The resultant temperature map from superposition is given in the fourth column of FIG. 5, perfectly matching the results from simulation, confirms the validity of the model.

3.2. Modeling Copper-Based Heat Sink

In traditional heat removal systems, a heat spreader, made of copper and relatively larger in size than the processor-die size, is attached on the back-side of the die. In addition, a fan could be installed directly on the top of the heat spreader to increase the heat removal capacity. In our simulation, we model the multi-core processor die and the heat-spreader directly, while, heat-removal capabilities of different fans are simulated by varying the heat-transfer coefficient at the top side of metal heat spreader. The model simulated using FEM is shown in FIG. 6a; and, the meshed model is shown in FIG. 6b.

Unlike oil-based system, where we had to simulate both flow and heat-transfer physics simultaneously, with a metal heat spreader system, we only need to simulate the heat transfer with appropriate boundary conditions. The dimensions used for the heat spreader in our simulation model are the actual dimensions of the heat spreader that came with our experimental processor. Finally, to compute the modeling matrix ($R_{cu}$) for the cu-system, we simulate the thermal response of the system by applying unit power pulses at each block, one at a time and assemble the column of the model $R_{cu}$ as discussed in Section 3.1.

3.3. Heat Sink Thermal Translation

We replaced the conventional fan-cooled copper heat-spreader heat sink system with a special fluid-based heat sink system to capture the thermal images of the processor. The thermal characteristics of the mineral oil and its direction flow changes the temperature profile of the die, which has implications on leakage power. That is, if we run same workload on the processor, we get different temperature and leakage profiles for two heat sink systems.

An accurate technique is provided to compute the temperature profile of the die for Cu-based heat sink system from the measured temperature profile for oil-based heat sink system. The technique is as follows. Let's assume that some power profile p is imposed in the simulation model on the die, then the temperature profile in two cases can be expressed as:

$$R_{oil}p=t_{oil} \quad (2)$$

$$R_{cu}p=t_{cu} \quad (3)$$

From Equations (2) and (3), we could write:

$$R_{cu}^{-1}t_{cu}=R_{oil}^{-1}t_{oil} \Rightarrow t_{cu}=R_{cu}R_{oil}^{-1}t_{oil}$$

It is worth mentioning here that the thermal resistance matrices, $R_{cu}$ and $R_{oil}$, need not to be square matrices as there are typically many more pixels than blocks in the floor plan. In such cases, we either need to compute pseudoinverse of the matrix or we have to solve following equation to obtain $t_{cu}$ from $t_{oil}$:

$$t_{cu}=(R_{cu}R_{cu}^T)^{-1}R_{cu}(R_{cu}^TR_{cu})(R_{oil}^TR_{oil})^{-1}R_{oil}^Tt_{oil} \quad (4)$$

In order to validate the above technique, we applied a power profile of 40 W to our die model and simulated the temperature profile for oil-based system in COMSOL. The simulated profile for the oil-system is shown in FIG. 7a. Next, we computed the temperature profile for cu-based system in two ways: 1) using the proposed technique, and 2) using COMSOL for reference. As could be seen from FIG. 7b and FIG. 7c, the two temperature profiles, computed in two ways, for the Cu-system are exactly the same. This confirms that the simulation framework for two systems is correct. To further illustrate the usefulness of the proposed technique, we ran standard benchmark applications on three cores of our experimental quad-core processor (described in details in Section 7). The measured thermal map of the processor is given in FIG. 8a, and the translated thermal image for the Cu-based system is given in FIG. 8b.

It is clear that the two heat removal mechanisms have different thermal profiles, and our method is capable of translating between the thermal profiles, compensating for the differences. In contrast to the prior art, the thermal profile is computed for Cu-based system in accurate way by modeling the heat sink systems more accurately.

4. Leakage Modeling by Thermal Conditioning

Referring generally to FIG. 9, aggressive scaling in sub-100 nm technologies has increased the contribution of leakage power to the total processor power. Furthermore, the inherent statistical fluctuations in nanoscale manufacturing have increased within-die process variability, which impacts the leakage profile of the die. Leakage also has strong dependency on temperature, and as a result, the thermal profile of the die can vary due to leakage temperature interaction. In this section, we propose a spatial leakage power mapping method based on a novel thermal conditioning technique.

The subthreshold leakage current, which is the dominant component of leakage power, is given by:

$$P_{sub} = VA\frac{W}{L}v_T^2\left(1 - e^{\frac{-V_{DS}}{v_T}}\right)e^{\frac{(V_{GS}-V_{th})}{av_T}} \quad (5)$$

where $P_{sub}$ is the subthreshold leakage power, V is the supply voltage, A is a technology dependent constant, $V_{th}$ is the threshold voltage, W and L are the device effective channel width and length respectively, $v_T$ is the thermal voltage, $V_{DS}$ and $V_{GS}$ are the drain-to-source voltage and gate-to-source voltage respectively, and a is the subthreshold swing coefficient for the transistor. Although leakage is exponential on temperature, for a given voltage and device and range of typical operation (20 Celsius-85 Celsius), we can use Taylor series expansion to approximate the leakage power near a reference temperature $T_{ref}$. An expansion that includes up the quadratic terms is given by:

$$P_{sub}(T)=P_{ref}+\alpha_1(T-T_{ref})+\alpha_2(T-T_{ref})^2 \cdot tm \quad (6)$$

where $P_{sub}(T)$ is the leakage power at temperature T, $P_{ref}$ is the leakage power at the reference temperature $T_{ref}$, and a1 and a2 are constants that depend on the voltage, process variability, and structure of devices. To model the chip's spatial leakage profile, we divide our die area into sufficiently large number of locations, n, such that the leakage power, $P_{sub}(T_i)$, at location i is given by:

$$P_{sub}(T_i)=P_{ref,i}+\alpha_{1,i}(T_i-T_{ref})+\alpha_{2,i}(T_i-T_{ref})^2 \quad (7)$$

where Ti is the average temperature at location i, and $a_{1,i}$ and $a_{2,i}$ are model coefficients for location i. The total leakage power is sum of all the n locations in the chip, which can be written as:

$$P_{leakage} = \sum_i P_{ref,i} + \sum_{i=1}^{n} [\alpha_{1,i}(T_i - T_{ref}) + \alpha_{2,i}(T_i - T_{ref})^2], \quad (8)$$

which can be re-arranged as $$P_{leakage} - \sum_i P_{ref,i} = \sum_{i=1}^{n} \alpha_{1,i}\Delta T_i + \alpha_{2,i}\Delta T_i^2$$

$$\Delta P = \sum_{i=1}^{n} \alpha_{1,i}\Delta T_i + \alpha_{2,i}\Delta T_i^2,$$

where $\Delta P = P_{leakage} - \Sigma_i P_{ref,i}$.

In order to learn the model coefficients, we propose a novel thermal conditioning method. The idea is to increase the temperature of the chip gradually by increasing the temperature of the oil, while simultaneously recording the thermal images of the die, and measuring the total power consumption of the chip. Throughout the experiment, an application of stable nature is always executing.

The increase in total power consumption would purely be due to changes in leakage. Thus, each thermal conditioning experiment provides a thermal image and an incremental total leakage power, which creates an instance of Equation 8 above. For example, the $j^{th}$ thermal conditioning experiment will provide the following equation:

$$\Delta P_j = \sum_{i=1}^{n} \alpha_{1,i}\Delta T_{j,i} + \alpha_{2,i}\Delta T_{j,i}^2 \quad (9)$$

If we perform m thermal conditioning experiments, we can assemble the system of equations:

$$\begin{bmatrix} \Delta T_{1,1} & \Delta T_{1,1}^2 & \cdots & \Delta T_{1,n} & \Delta T_{1,n}^2 \\ \vdots & \vdots & \ddots & \vdots & \vdots \\ \Delta T_{m,1} & \Delta T_{m,1}^2 & \cdots & \Delta T_{m,n} & \Delta T_{m,n}^2 \end{bmatrix} \begin{bmatrix} \alpha_{1,1} \\ \alpha_{2,1} \\ \vdots \\ \alpha_{1,n} \\ \alpha_{2,n} \end{bmatrix} = \begin{bmatrix} \Delta P_1 \\ \vdots \\ \Delta P_m \end{bmatrix} \quad (10)$$

We solve above system of equations by standard least-square regression to find first-order and second-order model coefficients; a total of 2n a coefficients. To compute the leakage power, $P_{ref}$, at the reference temperature, we fit a quadratic model of the power measured to the average temperature from the thermal maps of the chip, and extrapolate to get the dynamic power. We estimate the $P_{ref}$ by subtracting the dynamic power from the total power measured at $T_{ref}$. For a particular chips, these coefficients need to be computed only once, and then for estimating leakage of any thermal profile for the chip.

To implement thermal conditioning in our experimental setup, we use a thermoelectric device and a fluid monitoring device in line with the oil flow, or coolant fluid flow, as shown in FIG. 9. By changing the voltage and current of the thermoelectric device, we can either cool or heat the fluid to any desired temperature. Thus, we setup a feedback control system to control the fluid temperature to any desired set temperature point. In the feedback loop, the fluid temperature is compared to the set point and the error is fed to a PI controller or feedback controller, the output of which derives the programmable power supply of the thermoelectric device.

Referring to FIG. 9, in one embodiment, the system comprises one or more sensor devices, an A/D-D/A acquisition interface or box, a feedback controller, an adjustable motor pump, a thermoelectric cooler. The one or more sensor devices are configured to measure coolant fluid flow speed, such as oil, and coolant fluid temperature. An A/D-D/A acquisition interface or box is configured to collect the flow speed and temperature of the fluid. The A/D-D/A acquisition interface or box is configured to adjust the speed of the fluid flow and the temperature of the fluid to maintain a set temperature point. A motor pump is configured to adjust the speed of the fluid flow as instructed by the A/D-D/A acquisition interface or box. A thermoelectric cooler is configured to adjust the temperature of the fluid as instructed by the A/D-D/A acquisition interface or box.

In one embodiment, a feedback controller OR pi controller is operationally connected to the A/D-D/A acquisition interface to collect the flow speed and temperature of the fluid and adjust the speed of the fluid flow and the temperature of the fluid to maintain a set temperature point. By way of example, and without limitation, the feedback controller is implemented on a computer, network, or internet.

In operation, based upon the measurements of the coolant fluid flow speed and the temperature and comparison to the set temperature point, the A/D-D/A acquisition interface adjusts the speed and temperature of the coolant fluid flow to maintain the set temperature point of the coolant fluid.

5. Thermal To Power Mapping

Reconstructing the underlying power map of the processor from the measured thermal images is an inverse problem. In the framework presented in this paper, we measure the thermal maps for oil-based cooling system ($t_{oil}$) and reconstruct the power-dissipation in different sub-units of the quad-core die for the Cu-based cooling system. We first compute leakage power in each die-unit from the equivalent thermal image for the Cu-system and use the leakage power as the lower bound while reconstructing the total power for each unit. In particular, we solve following optimization problem to reconstruct the power map of the die, $$p^* = \arg_p \min \|R_{cu}p - R_{cu}(R_{oil}R_{oil}^T)^{-1}R_{oil}t_{oil}\|_2 \quad (11)$$

$$\text{s.t. } p_i^{leak} \leq p_i$$

where, $p^*$ is the reconstructed power-vector, $p_i^{leak}$ denotes the leakage power in the $i^{th}$ die-block, and pi denotes the power in the $i^{th}$ block of the die. Other terms, $R_{cu}$, p, $R_{oil}$, and t, are already defined in the text before. By solving the above optimization problem, we obtain the total power of each block for the die. Finally, we compute the dynamic power of each block by subtracting the leakage power from the reconstructed total power. Using, $p_i^{leak} > 0$ constraint helps in ensuring that dynamic power for all blocks is always positive. Hence, we reconstruct all, dynamic-, leakage-, and total-, powers for each block of the processor from the measured temperature image of the processor.

In one embodiment, a thermal-to-power modeling system is configured to receive a fluid flow speed, such as coolant or other types of fluids or materials for cooling integrated circuits, and temperature of the fluid from the one or more sensor devices. The thermal-to-power modeling system is configured to receive a floor plan of the integrated circuit. The thermal-to-power modeling system is configured to setup a finite-element model which simulates the heat conduction in the integrated circuit and the heat convection at its surface due to coolant fluid motion. The finite-element model is configured to estimate the entries in a thermal-to-power modeling matrix in either DC mode or AC mode.

6. Power Modeling Using PMCS

Referring to FIG. 10, Our infrared-based power mapping technique directly obtains the power consumption of each circuit block under different workload conditions. Thus, we propose to simultaneously collect the measurements of the PMC, while collecting the infrared imaging data. The post-silicon power estimates are then used to derive fitted empirical models that relate the performance counters to the power consumption of each of block. For instance, if $m_1$, $m_2$, $m_3$ are three PMCs correlated to the power estimates, $p_i$, of block i, then an empirical model, $\hat{p}_i$, can be described as $\hat{p}_i = c_0 + c_1 m_1 + c_2 m_2 + c_3 m_3$, where $c_0$, $c_1$, $c_2$ and c3 are the model coefficients which have to be determined by fitting the observed power estimates of each block with the PMC measurements on a training set of workloads. The fitting is done using least-square estimation, where it is desired to minimize the modeling error, $(\hat{p}_i - p_i)^2$ over the training data. The main steps of our power modeling procedure are summarized in FIG. 10.

The fitted PMC models can enable us to substitute the post-silicon power mapping results in situations where infrared imaging is difficult. These cases include, for example, systems deployed in user environments where access to infrared imaging is not easy, or for high-resolution transient power mapping. Infrared-based transient power mapping is inherently limited because of the low-pass filtering of power variations and the limited sampling rate of infrared cameras. We illustrate the use of PMC-based models for transient power modeling in Section 7 below.

7. Experimental Setup and Results

Referring to FIGS. 11-20, our experimental system consists of a motherboard fitted with a 45 nm AMD Athlon II X4 610e quad-core processor and 4 GB of memory. It should be noted that the AMD quad-core processor is merely an example of an integrated circuit, the present invention is not limited to this particular processor, and that any integrated circuit may be used in the system, apparatus, method of the present invention. The motherboard runs Linux OS with 2.6.10.8 kernel. The floor plan of the processor with 11 different blocks is shown in FIG. 11. We treat each core as one block, as we could not find public-domain information on the make-up of blocks within each core. The processor has 4×512 KB L2 caches, which are easy to identify in the floor plan. The processor lacks a shared L3 cache. The area in the center is occupied by the northbridge and other miscellaneous components such as the main clock trunks, the thermal sensor, and the built-in thermal throttling and power management circuits. The periphery is composed of the devices for I/O and DDR3 communication. The processor supports four distinct DVFS settings. Except for the first experiment, we set the DVFS to 1.7 GHz. We image the processor using a mid-wave FLIR 5600 camera with 640× 512 pixel resolution. We also intercept the 12 V supply lines to the processor and measure the current through a shunt resistor connected to an external Agilent 34410A digital multimeter, which enables to log the total power measurements of the processor.

7.1. Experiment 1. Verification of Modeling Matrices

Given the processor layout and our setup, we first constructed the modeling matrices, $R_{oil}$ and $R_{cu}$, that map the power consumption to temperatures across the die in case of oil-based heat removal and Cu-based heat removal respectively. We compute these matrices by using finite-element modeling and simulation techniques described in Section 3. In our first experiment, we verify the accuracy of the $R_{oil}$ by comparing its modeling results against the images for the thermal system.

To verify the accuracy of our modeled matrix $R_{oil}$, a custom cpu-intensive micro-benchmark is utilized. The quad-core AMD processor has four DVFS settings: 0.8 GHz, 1.7 GHz, 1.9 GHz, and 2.4 GHz. First, we run the custom application on all four cores at 2.4 GHz frequency and capture the steadystate thermal image of the die and measure the total power of the processor. Let $t_1$ be the resultant thermal image, and $p_1$ denotes the total measured power. Then, we change the frequency of just core 1 to 0.8 GHz to ensure that the switching activity profile changes only in one core. We again capture a steady-state thermal image, $t_2$ of the processor and measure total power $p_2$. Since the activity change was localized to only one core, we can expect the difference in power profiles, as denoted by the vector δp, between the two cases to be mainly zero everywhere, but equal to p1-p2 at the vector position corresponding to core 1. Thus, we can compare the thermal simulation results of $R_{oil} \delta p$ against the actual thermal image difference $t_1$-$t_2$ to verify the accuracy of the $R_{oil}$ model. The first column FIG. 12 contrasts the simulation versus the real thermal map, showing the accuracy we obtained. We also repeated the same procedure for the other three cores and include the results in FIG. 12.

7.2. Experiment 2. Demonstration of Power Mapping

The goal of the second experiment is to demonstrate the results of power mapping the processor using different number of workloads and different workload characteristics. Our workloads come from widely used SPEC CPU06 benchmark suite. We selected four benchmark applications, which cover both integer point and floating point computations and processor-bound and memory-bound characteristics. These benchmarks are listed in Table 2.

TABLE 2

Selected SPEC CPU06 benchmarks.

|  | memory bound | processor bound |
| --- | --- | --- |
| Integer point | omnetpp | hmmer |
| Floating point | soplex | gamess |

7.2.1. Evaluation of total, dynamic and leakage power map over various workloads: In order to demonstrate the process of reconstructing power dissipation in different subunits of multi-core processor from the measured images, we ran 30 different cases of workload sets. For each experiment, we captured the steady-state thermal image using an infrared camera and reconstructed the underlying power maps from the translated thermal maps to the Cu-based spreader. We decomposed the total power maps into dynamic and leakage power dissipation of each block of the processor and analyzed the spatial leakage variability. For example, the reconstructed maps for four sample cases are shown in FIG. 13. The third row shows a case, where we ran soplex, gamess, and hmmer benchmarks on cores 1, 2, and 3 respectively. Second column shows the equivalent temperature maps for Cu-system for each workload-case. The third column shows the reconstructed total power dissipation in each block for the four cases. It is clear from the reconstructed power-maps that they agree the intuitive expectation that cores running processor-bound applications (i.e., hmmer and games) are having higher power consumption than the idle cores or cores running memorybound workloads. Similarly, fourth and fifth column show the per-unit reconstructed dynamic power and leakage power for four different workloads. The figures also show that the L2 cache power is mainly dominated by leakage power with a small amount of dynamic power.

The per-block power results for all 30 different workload cases are presented in Table 3 below.

TABLE 3

Power-mapping results for 30 test cases. N.B. stands for north bridge block; dyn stands for dynamic; lkg stands for leakage; dyn + lkg is the total power reconstructed from post-silicon in infrared imaging; and meas is the total power measured through the external digital multimeter.

| core 1 | core 2 | core 3 | core 4 | Reconstructed total power (W) for each block |||||||||
|---|---|---|---|---|---|---|---|---|---|---|---|
| | | | | core 1 | L2-1 | core 2 | L2-2 | core 3 | L2-3 | core 4 | L2-4 |
| omnetpp | — | — | — | 3.91 | 0.28 | 1.06 | 0.23 | 1.10 | 0.15 | 1.61 | 0.40 |
| — | omnetpp | — | — | 1.51 | 0.23 | 3.49 | 0.25 | 1.18 | 0.15 | 1.58 | 0.28 |
| — | — | omnetpp | — | 1.55 | 0.23 | 1.18 | 0.23 | 3.31 | 0.15 | 1.50 | 0.26 |
| — | — | — | omnetpp | 1.59 | 0.36 | 1.14 | 0.23 | 0.92 | 0.15 | 3.95 | 0.17 |
| hmmer | — | — | — | 5.68 | 0.23 | 0.97 | 0.23 | 0.99 | 0.15 | 1.55 | 0.40 |
| soplex | — | — | — | 4.07 | 0.30 | 1.02 | 0.23 | 1.08 | 0.15 | 1.60 | 0.38 |
| gamess | — | — | — | 5.41 | 0.23 | 0.94 | 0.23 | 0.89 | 0.15 | 1.51 | 0.42 |
| omnetpp | omnetpp | — | — | 3.81 | 0.31 | 3.19 | 0.23 | 1.24 | 0.15 | 1.78 | 0.36 |
| hmmer | hmmer | — | — | 5.90 | 0.25 | 5.07 | 0.24 | 0.96 | 0.16 | 1.82 | 0.41 |
| soplex | soplex | — | — | 3.94 | 0.34 | 3.30 | 0.24 | 1.30 | 0.16 | 1.84 | 0.37 |
| gamess | gamess | — | — | 5.60 | 0.26 | 4.80 | 0.24 | 0.84 | 0.16 | 1.68 | 0.45 |
| omnetpp | — | soplex | — | 3.90 | 0.32 | 1.11 | 0.23 | 3.55 | 0.16 | 1.75 | 0.35 |
| omnetpp | — | hmmer | — | 4.05 | 0.34 | 0.99 | 0.24 | 5.29 | 0.16 | 1.73 | 0.35 |
| omnetpp | — | gamess | — | 4.16 | 0.35 | 1.04 | 0.24 | 5.05 | 0.16 | 1.70 | 0.37 |
| hmmer | — | soplex | — | 6.01 | 0.24 | 0.98 | 0.24 | 3.57 | 0.16 | 1.79 | 0.42 |
| hmmer | — | gamess | — | 6.08 | 0.25 | 0.88 | 0.24 | 4.98 | 0.16 | 1.67 | 0.42 |
| soplex | — | gamess | — | 4.38 | 0.38 | 1.05 | 0.24 | 5.16 | 0.16 | 1.77 | 0.36 |
| soplex | soplex | soplex | — | 3.86 | 0.38 | 3.17 | 0.32 | 3.48 | 0.16 | 2.00 | 0.35 |
| hmmer | hmmer | hmmer | — | 6.28 | 0.27 | 5.24 | 0.26 | 5.55 | 0.17 | 2.09 | 0.41 |
| omnetpp | omnetpp | omnetpp | — | 3.91 | 0.37 | 3.18 | 0.30 | 3.48 | 0.16 | 1.98 | 0.37 |
| gamess | — | gamess | gamess | 6.13 | 0.60 | 0.76 | 0.25 | 4.61 | 0.17 | 6.51 | 0.18 |
| gamess | gamess | gamess | — | 5.98 | 0.36 | 5.06 | 0.36 | 5.11 | 0.17 | 1.87 | 0.43 |
| omnetpp | soplex | gamess | — | 4.09 | 0.40 | 3.46 | 0.36 | 5.52 | 0.17 | 2.03 | 0.36 |
| omnetpp | soplex | hmmer | — | 4.02 | 0.39 | 3.31 | 0.31 | 5.65 | 0.17 | 2.06 | 0.36 |
| soplex | gamess | hmmer | — | 4.33 | 0.44 | 5.16 | 0.35 | 5.72 | 0.17 | 2.11 | 0.35 |
| soplex | soplex | soplex | soplex | 3.92 | 0.54 | 3.10 | 0.27 | 3.24 | 0.16 | 4.35 | 0.25 |
| hmmer | hmmer | hmmer | hmmer | 6.37 | 0.50 | 5.13 | 0.28 | 5.21 | 0.18 | 7.34 | 0.19 |
| gamess | gamess | gamess | gamess | 6.32 | 0.67 | 5.16 | 0.30 | 4.83 | 0.18 | 6.89 | 0.20 |
| omnetpp | omnetpp | omnetpp | omnetpp | 3.98 | 0.54 | 3.17 | 0.27 | 3.31 | 0.16 | 4.44 | 0.25 |
| soplex | hmmer | gamess | omnetpp | 4.31 | 0.60 | 5.49 | 0.27 | 5.49 | 0.18 | 4.77 | 0.25 |

| core 1 | core 2 | core 3 | core 4 | Reconstructed total power (W) for each block ||| Total power (W) ||||
|---|---|---|---|---|---|---|---|---|---|---|
| | | | | I/O | N. B. | DDR3 | dyn | lkg | dyn + lkg | meas |
| omnetpp | — | — | — | 1.40 | 4.23 | 1.13 | 11.52 | 3.97 | 15.49 | 16.82 |
| — | omnetpp | — | — | 1.52 | 4.4 | 1.10 | 11.70 | 3.97 | 15.68 | 16.85 |
| — | — | omnetpp | — | 1.67 | 4.36 | 1.05 | 11.52 | 3.97 | 15.49 | 16.97 |
| — | — | — | omnetpp | 1.56 | 4.15 | 1.01 | 11.26 | 3.96 | 15.22 | 16.81 |
| hmmer | — | — | — | 1.22 | 4.34 | 0.97 | 12.72 | 4.02 | 16.73 | 18.49 |
| soplex | — | — | — | 1.29 | 4.3 | 1.09 | 11.54 | 3.97 | 15.51 | 17.11 |
| gamess | — | — | — | 1.21 | 4.23 | 0.90 | 12.13 | 3.99 | 16.12 | 18.23 |
| omnetpp | omnetpp | — | — | 1.29 | 5.19 | 1.07 | 14.55 | 4.10 | 18.65 | 19.60 |
| hmmer | hmmer | — | — | 1.26 | 5.95 | 0.97 | 18.70 | 4.30 | 23.00 | 23.70 |
| soplex | soplex | — | — | 1.29 | 5.3 | 1.13 | 15.08 | 4.12 | 19.20 | 19.82 |
| gamess | gamess | — | — | 1.22 | 5.72 | 0.87 | 17.60 | 4.24 | 21.84 | 23.17 |
| omnetpp | — | soplex | — | 1.28 | 5.19 | 1.07 | 14.80 | 4.11 | 18.91 | 19.86 |
| omnetpp | — | hmmer | — | 1.28 | 5.48 | 0.95 | 16.67 | 4.20 | 20.86 | 21.64 |
| omnetpp | — | gamess | — | 1.28 | 5.48 | 0.95 | 16.58 | 4.19 | 20.77 | 21.57 |
| hmmer | — | soplex | — | 1.24 | 5.51 | 1.04 | 17.00 | 4.21 | 21.22 | 21.72 |
| hmmer | — | gamess | — | 1.25 | 5.71 | 0.84 | 18.20 | 4.27 | 22.47 | 23.33 |
| soplex | — | gamess | — | 1.28 | 5.6 | 0.96 | 17.13 | 4.22 | 21.35 | 21.93 |
| soplex | soplex | soplex | — | 1.35 | 6.01 | 1.13 | 17.96 | 4.26 | 22.22 | 22.34 |
| hmmer | hmmer | hmmer | — | 1.35 | 7.53 | 0.88 | 25.35 | 4.68 | 30.03 | 28.71 |
| omnetpp | omnetpp | omnetpp | — | 1.35 | 6.05 | 1.12 | 18.00 | 4.26 | 22.26 | 22.23 |
| gamess | — | gamess | gamess | 1.32 | 6.71 | 0.74 | 23.41 | 4.57 | 27.99 | 27.99 |
| gamess | gamess | gamess | — | 1.30 | 7.22 | 0.76 | 24.02 | 4.60 | 28.62 | 28.30 |
| omnetpp | soplex | gamess | — | 1.38 | 6.66 | 1.02 | 21.02 | 4.42 | 25.45 | 24.07 |
| omnetpp | soplex | hmmer | — | 1.39 | 6.56 | 1.05 | 20.85 | 4.42 | 25.27 | 24.69 |
| soplex | gamess | hmmer | — | 1.36 | 7.16 | 0.97 | 23.54 | 4.57 | 28.11 | 27.01 |

TABLE 3-continued

Power-mapping results for 30 test cases. N.B. stands for north bridge block; dyn stands for dynamic; lkg stands for leakage; dyn + lkg is the total power reconstructed from post-silicon in infrared imaging; and meas is the total power measured through the external digital multimeter.

| soplex | soplex | soplex | soplex | 1.40 | 6.56 | 1.14 | 20.53 | 4.40 | 24.93 | 24.40 |
|---|---|---|---|---|---|---|---|---|---|---|
| hmmer | hmmer | hmmer | hmmer | 1.44 | 8.88 | 0.83 | 31.25 | 5.10 | 36.35 | 33.12 |
| gamess | gamess | gamess | gamess | 1.39 | 8.58 | 0.82 | 30.32 | 5.03 | 35.35 | 33.21 |
| omnetpp | omnetpp | omnetpp | omnetpp | 1.41 | 6.72 | 1.14 | 20.97 | 4.42 | 25.39 | 2.4.61 |
| soplex | hmmer | gamess | omnetpp | 1.43 | 8.06 | 0.91 | 26.97 | 4.79 | 31.77 | 29.52 |

We also report the total dynamic power, total leakage power, and the sum of leakage and dynamic power. The results show that the leakage power comprise about 20% of the total power. We also report in the last column the total measured power through the external multimeter after compensating for the total leakage difference between the oil-based sink and the Cu-based sink. We notice that our total estimated power through infrared-based mapping achieve very close results with an average absolute error of 1.07 W of the measured power. The differences could be either to modeling inaccuracies or due to the fact that the measured total power also include the power consumed by the off-chip voltage regulators, and thus, it does not represent the net power consumed by the processor. We have also considered including the total measured power as a constraint to the optimization formulation given in Section 5; however, the resultant power maps have displayed some counter-intuitive results.

7.2.2. Effect of Number of Applications

To see the impact of increasing number of applications on the power consumption of different blocks, such as, core, cache, northbridge, I/O, DDR3 channels, we run high power application hmmer in four different ways. First, we run one instance of hmmer on core 1, second, we run two instances of hmmer on core 1 and core 2, third we run three instances of hmmer on core 1, core 2 and core 3 and last we run four instances of hmmer on all four cores. FIG. 14 shows the trend of power consumption of different blocks in the processor as we increase number of applications. When a core is idle it usually clock gates, and consumes minimum power, but as we increase the number of applications, the total power of the four cores increases proportionally. In contrary, the power consumption from other blocks such as the northbridge, I/O, DDR3 do not change as much depending on the number of workloads, because those blocks do not clock gate and they are always operational.

7.2.3. Total Core Power Consumption Over Various Workloads

To get insight of how the core power consumption varies across different workloads, we plot in FIG. 15 the percentage of core power to the total power for all 30 test cases. We can see core to total power percentage is high for our higher power test cases, such as, hmmer and gamess. As the number of workload increases, the percentage of core to total power varies from 50% to 66% depending on the number of cores running applications and power profile of the applications.

7.3. Experiment 3. Process Variability and Leakage Power Estimation

To estimate the leakage profile for the AMD quad-core processor or any integrated circuit, we perform the thermal conditioning techniques described in Section 4, where we increase the chip temperature from 27° C. to 55° C. by increasing the cooling fluid temperature from 18° C. to 45° C., and measure the associated changes in power consumption and thermal profiles of the chip. The leakage power model coefficients are estimated for a grid of 19×21 locations on the chip using the collected data. To uncover the underlying leakage spatial variability introduced by process variability, we assume constant temperature throughout the die, and measure the leakage power for each grid location. FIG. 16 shows the leakage variability map, when applied a constant temperature of 60° C. across the chip. FIG. 17a shows the percentage leakage power for each core with its L2-cache. Core 1 has approximately 12% and core 4 has 6% more leakage than lowest power cores. This result for instance can be used to bias the operating system scheduler to locate application on the lower-leakage cores before the higher-leakage cores. FIG. 17b shows the total leakage power distribution among all the different block types. There is approximately 13.7% within-die variations among all the blocks.

7.4. Experiment 4. PMC-Based Power Modeling

In our third experiment we seek to create empirical models that relate the performance monitoring counters (PMC) to the post-silicon power consumption of each block in the quad-core processor as described in Section 6. We have collected the measurements of 11 PMCs for our quad-core processor using pfmon tool. The 11 PMC are listed in FIG. 18. We computed the correlation coefficient between the measurements of the performance counters and mapped power consumption of each block, and we report in FIG. 18 all the PMC that have strong to good correlation or anti-correlation with power consumption. For example, the number of retired mops (PMC #3), the data cache access (PMC #4), the retired branch instructions (PMC #11), the floating point instructions (PMC #2) all provide strong correlation to the power consumption of cores. In case of I/O and DDR channels, the L2 cache misses (PMC#5) provide a strong correlation of power consumption, while PMC #2, #11, #3, #4 provide strong anti correlation. Notice that these performance counters are strongly correlated with the power consumption of the caches and cores. That is, when the cores and caches are experiencing high activity, the I/O and DDR channels will experience low activity and vice versa.

Given the measurements of the PMC and their correlations with the post-silicon power mapping results, we empirically fit a power model for each processor block to its post-silicon estimated power using least-square estimation as described in Section 6. The input to the power models are the most correlated PMCs as described in the previous paragraph. For instance, we report in FIG. 19 the power consumption of Core 1 and the northbridge blocks as estimated by infrared mapping and the fitted PMC models. We notice that the PMC-based fitted models track the power mapping results closely, with a mean absolute error of 2.6% in the case of Core 1 and about 9.2% in case of the north bridge block.

To illustrate the use of PMC in transient modeling, we utilize the derived PMC models to estimate the transient power consumption for the different blocks of the processor.

FIG. 20 gives the power consumption for case 28 for the first 120 seconds in execution. We report in blue solid line the sum of power of all cores, the dashed blue line gives the power consumption of the northbridge, while the brown and dashed green lines give the power of IO and L2 caches respectively. Finally, the red line gives the total modeled power and the black line gives the total power form the external multimeter. We note that the PMC-based modeling is able to track the transient response accurately, following the changes in total power consumption.

8. Related Work

In contrast to methods of the prior art, we use finite-element method to accurately estimate the modeling matrix which encompasses all physical factors such as, cooling fluid temperature, fluid flow rate, heat transfer coefficients, chip geometry. Previous approaches to model R in simulation were only done for Cu spreader with the only objective of speeding thermal simulation runtime, where the model matrix R is used to substitute lengthy FEM-based thermal simulations. Post-silicon infrared imaging requires oil-based cooling system. The thermal analysis based on oil-based system differences from widely used Cu-based heat sink. Attempts to modify the oil-based system to match the Cu-based characteristics were not completely verified as they relied on the measurement of a single thermal sensor. Our method translates the full oil-based thermal map to Cu-based thermal map, which is then used for all of our power analysis.

Recent works to estimate within-die leakage variability include analytical methods, empirical models, statistical method. Actual chip leakage trend and values can deviate from these models significantly. Our leakage method accurately estimates leakage variabilities introduced by process variability without the need for any embedded leakage sensors that occupy silicon real estate.

In contrast to the prior art, where the PMCs are related and modeled to total chip power or simulated power, we relate actual power of each circuit block as estimated through infrared-based mapping to the runtime PMCs. This gives accurate per-block PMC models and enables us to isolate directly the PMCs responsible for power consumption at each block.

9. Conclusions

We have introduced multiple novel techniques that advance the state-of-the-art post-silicon power mapping and modeling. We have devised accurate finite-element models that relate power consumption to temperatures, while compensating for the artifacts introduced by using infrared-transpired heat removal techniques. We have devised techniques to model leakage power through the use of thermal conditioning. These leakage power models were used to yield fine-resolution leakage power maps and within-die variability trends for multi-core processors. We have devised an optimization formulation that inverts temperature to power and decomposes this power into its dynamic and leakage components. We analyzed the power consumption of different blocks of quad-core processors under different workload scenarios from the SPEC CPU 2006 benchmarks. Our results reveal a number of insights into the make-up and scalability of power consumption in modern processors. We also devised accurate empirical models that estimate the infrared-based per-block power maps using the PMC measurements. We have used the PMC models to accurately estimate the transient power consumption of different processor blocks.

The system and method enables accurate and detailed power analysis and modeling of integrated circuits. This analysis is used to identify the power hungry components in a circuit under different workloads and process variabilities. Our system will enable semiconductor companies and developers of computing systems to quantify the sources of power consumption in great accuracy and detail.

In one embodiment, one or more external measurement systems may be configured to measure the total power consumption on different rails of the integrated circuits. The one or external measurement systems comprises one or more internal thermal sensors to establish constraints, the constraints facilitate the thermal-to-power modeling system to produce power mapping results. In one embodiment, a thermal-to-power optimization system operationally combines the thermal-to-power modeling system and the one or more external measurement systems.

In one embodiment, a run-time power estimator system is configured to collect performance monitoring counter (PMC) measurements from one or more circuit blocks of the integrated circuits in synchronization while performing infrared-based power mapping. The run-time power estimator system uses the collected per-block PMC measurements to calculate mathematical PMC-based models for the actual power consumption of the one or more circuit blocks as identified by the infrared-based power mapping. The PMC-based models are configured to estimate power consumption when infrared imaging is unavailable. The PMC-based models are configured to analyze the transient power consumption of the one or more circuit blocks. The PMC-based models are configured to be used for power estimation and management.

One or more embodiments and elements of the present invention, comprising but not limited to the feedback controller, may operate on a network for implementing the system of the present invention. By way of example, the system can be employed in conjunction with a computer-based system, where the elements can be implemented in hardware, software, firmware, or combinations thereof. Network may include workstations, specialist workstations, and intermediary workstations. Each of the workstations may be configured to communicate with an application server via internet connections. The server may include processors and memory for hosting different versions of the software, with respect to the detailed description of the exemplary implementation.

Any combination of one or more computer readable medium(s) may be utilized in the present invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An automated process for creating a thermal-to-power model for an integrated circuit comprising:
    determining a floor plan of the integrated circuit;
    dividing the integrated circuit into blocks based on the floor plan;
    pumping oil through an inlet valve, over the integrated circuit, and out an outlet valve to create a simulated oil-based cooling system;
    injecting a plurality of power pulses across the integrated circuit;
    applying infrared image techniques to the integrated circuit to create measured thermal images for the simulated oil-based cooling system;
    setting up a finite-element model (FEM) to estimate entries in a first thermal-to-power modeling matrix for the simulated oil-based cooling system;
    determining and storing performance monitoring counter (PMC) measurements related to power consumptions of the blocks of the integrated circuit;
    reconstructing a power dissipation for the simulated oil-based cooling system by using a thermal map derived from the measured thermal images for the simulated oil-based cooling system;
    using the reconstructed power dissipation of the simulated oil-based cooling system, the FEM, and the PMC measurements to create a thermal map for a copper based cooling system; and
    creating a final thermal-to-power model for the integrated circuit from the thermal map for the model copper based cooling system.

2. The automated process of claim 1 wherein setting up an FEM includes simulating and tracking heat conditions within the integrated circuit, and heat convection at the surface of the integrated circuit, due to a motion of the oil over the integrated circuit to help set up the FEM.

3. The automated process of claim 2 wherein reconstructing power dissipation for the simulated oil-based cooling system further includes decomposing per-block power consumption into dynamic and leakage components.

4. The automated process of claim 3 further comprising estimating a leakage profile by incrementally increasing the temperature of the pumped oil and measuring associated changes in power consumption with respect to the blocks of the integrated circuit.

5. The automated process of claim 1 wherein:
    pumping oil through the inlet valve is done at a controlled rate; and
    the controlled rate is a variable rate in reconstructing power dissipation for the simulated oil-based cooling system.

* * * * *

UNITED STATES PATENT AND TRADEMARK OFFICE
CERTIFICATE OF CORRECTION

PATENT NO. : 10,175,705 B2
APPLICATION NO. : 14/183384
DATED : January 8, 2019
INVENTOR(S) : Sherief Reda, Abdullah Nowroz and Kapil Dev It is certified that error appears in the above-identified patent and that said Letters Patent is hereby corrected as shown below:

In the Specification

Column 1, beginning at Line 15, the STATEMENT REGARDING FEDERALLY SPONSORED RESEARCH should read:
--This invention was made with government support under grant number 1115424 awarded by the National Science Foundation. The government has certain rights in the invention.--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*